Oct. 4, 1955     A. E. HARTMAN     2,719,504
DIRECTIONAL SIGNAL ATTACHMENT FOR SPOTLIGHTS
Filed Oct. 8, 1954
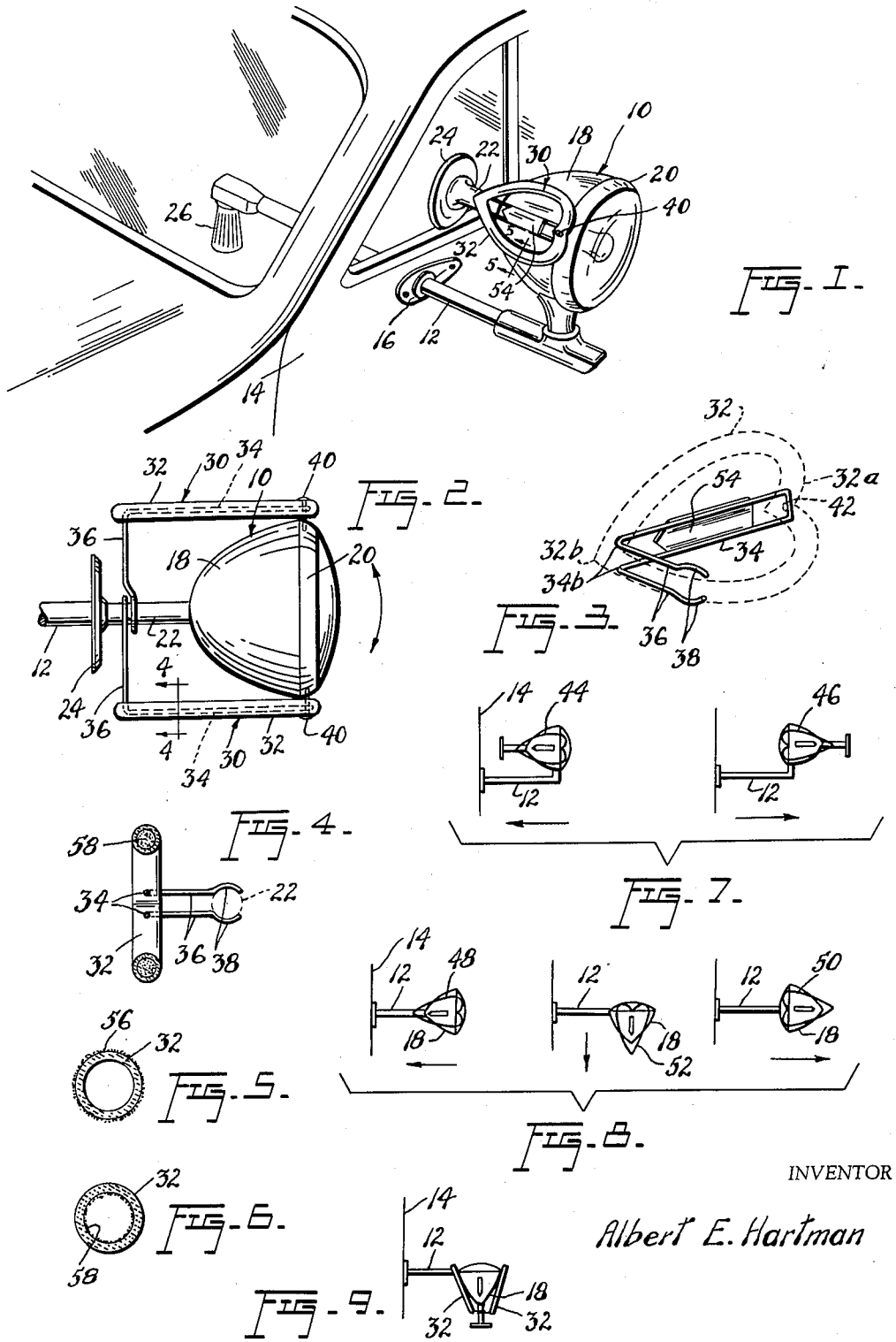
INVENTOR
*Albert E. Hartman*

United States Patent Office 2,719,504
Patented Oct. 4, 1955

2,719,504

DIRECTIONAL SIGNAL ATTACHMENT FOR SPOTLIGHTS

Albert E. Hartman, Washington, Kans.

Application October 8, 1954, Serial No. 461,224

2 Claims. (Cl. 116—47)

This invention relates to new and useful improvements and structural refinements in automotive signalling apparatus, and more particularly, the invention concerns itself with a direction and stop signalling device which may be quickly and easily applied in the nature of an attachment or an accessory to a conventional automobile spot light.

As is well known, a conventional spot light is usually mounted on a vehicle for universal movement in horizontal and vertical planes, and by attaching a signalling device to the spot light for movement therewith, the signalling device may be conveniently adjusted to a desired indicating position by simply manipulating the usual adjusting means for the spot light itself.

An important feature of the invention resides in the provision of novel means for supporting and attaching the signalling device to the spot light, these means being such that the attachment may be made in a variety of different manners so that, in turn, appropriate signals may be given.

Another feature of the invention resides in the provision of luminescent means on the signalling device, whereby the same may be clearly and easily visible during darkness.

With the above more important objects and features in view and such other objects and features as may become apparent as this specification proceeds, the invention resides in the details of construction and arrangement of parts as shown in the accompanying drawing, wherein like characters of reference are used to designate like parts and wherein:

Figure 1 is a perspective view of the invention;

Figure 2 is a fragmentary top plan view thereof;

Figure 3 is a perspective view of the attachment clip used in the invention, the signalling member being shown by dotted lines;

Figure 4 is a sectional detail, taken substantially in the plane of the line 4—4 in Figure 2;

Figure 5 is a sectional detail, on an enlarged scale, taken substantially in the plane of the line 5—5 in Figure 1;

Figure 6 is a sectional detail, similar to that shown in Figure 5 but showing a modified form of the invention;

Figure 7 is a group diagrammatical illustration of the invention in use;

Figure 8 is a group diagrammatical illustration of the invention in use, but applied to the spot light in a modified manner;

Figure 9 is a diagrammatical illustration of the invention applied to the spot light in a further modified manner.

Referring now to the accompanying drawing in detail, the general reference numeral 10 designates a conventional automobile spot light including a supporting arm 12 passing through a wall or door of a vehicle 14 to which it is secured by a mounting bracket 16, the outer end of the arm 12 carrying a lamp housing 18 which is provided with the customary lens retaining rim 20.

The relatively small or tapered end of the housing 18 is equipped with a projecting bar or bracket 22 carrying a mirror 24. The inner end of the arm 12 is provided with a control handle 26 and it will be understood that the arm 12 is rotatable in the bracket 16 and that conventional means (not shown) operatively connect the handle 26 to the lamp housing 18, whereby the spot light is movable universally in horizontal and vertical planes.

The invention resides in the provision of a signalling apparatus designated generally by the reference numeral 30, the same comprising a substantially heart-shaped signalling member 32 which is preferably formed from tubular material and includes a rounded end portion 32a and a pointed end portion 32b. An elongated clip, preferably formed from wire, or the like, and having a substantially U-shaped configuration, has the bight portion thereof embedded in the rounded end portion of the member 32, this clip being designated by the numeral 34, as is best shown in Figure 3. The clip 34 extends centrally of the member 32 and is also embedded in the pointed end portion 32b of the member 32 as indicated at 34b, whereupon angulated continuations of the clip constitute a pair of resilient jaws 36 having opposing concave seats 38 at the free extremities thereof.

When the device 30 is applied to the spot light, as illustrated in Figures 1, 2 and 7, it is disposed at a side of the lamp housing 18 and a fastening element such as a screw 40 is placed in an aperture 42 in the rounded end portion 32a of the member 32 and is extended through the lens retaining rim 20 so as to hold the rim as well as the rounded end portion of the member 32 on the lamp housing. Moreover, the jaws 36 of the clip 34 are frictionally engaged with the aforementioned bracket 22 which is received in the concave seats 38 of the jaws, as is best shown in Figure 4. It is to be understood that a pair of the devices 30 are used, one at each side of the lamp housing as illustrated in Figure 2, and when the invention is placed in use and the spot light is rotated in a horizontal plane so that it is directed at right angles toward the outside of the vehicle as shown in Figure 1, the signalling members 32, both at the front and the back side of the spot light will indicate a "right turn" as illustrated at 44 in Figure 7 which shows the device as viewed from the front of the vehicle. However, by simply rotating the spot light through 180° in a horizontal plane, the apparatus will indicate a "left turn" as illustrated at 46 in Figure 7.

With reference now to the accompanying Figure 8 which illustrates, as viewed from the front of the vehicle, a modified arrangement of attaching the signalling apparatus to the spot light, in this instance the members 32 are disposed at the top and bottom of the lamp housing rather than at the opposite sides thereof and the spot light is rotated either forwardly or rearwardly in a vertical plane, through 90° from the position shown in Figure 1. Under such circumstances the signalling position shown at 48 indicates a "left turn," the position shown at 50 indicates a "right turn" and the downwardly directed position shown at 52 indicates a "stop."

Another alternative attachment of the signalling apparatus to the stop light is shown in Figure 9, which is similar to that in Figures 1, 2 and 7, with the exception that the length of the jaws 36 is reduced so that the members 32, rather than being parallel as in Figure 2, have the pointed end portions thereof mutually convergent. As a result, when the spot light is rotated from the position shown in Figure 1, first forwardly through 90° and then upwardly through 90°, the members 32 are both visible from both front and rear and, by virtue of their downwardly directed, V-shaped formation as shown in Figure 9, are used to indicate a "stop."

It is to be understood that apart from the specific arrangements above described, the signalling apparatus may be attached to the spot light in any desired manner to effect various other desired signalling operations.

In addition to the signalling effect afforded by the heart-shaped configuration of the member 32, a strip-shaped arrow or pointer 54 is affixed in a suitable manner to the clip 34 so that it is disposed centrally in the member 32 and directed toward the pointed end 32b of the latter.

In order that the signalling apparatus may be readily and clearly visible in darkness, a coating of luminescent material 56 is applied to the outer surface of the tube from which the member 32 is formed, as indicated at 56 in Figure 5. Alternatively, in order to protect the luminescent material from harmful effects of weather, it may be applied to the inner surface of the tube, as shown at 58 in Figure 6. In the latter instance, the member 32, of course, is formed from transparent material, so that the luminescent material at the inside thereof is visible. If desired, luminous coating may be also applied to the pointer 54.

Although in the foregoing there have been described and shown the preferred embodiments of the invention, other modifications may become apparent to those skilled in the art to which the invention relates. Accordingly, it is not desired to limit the scope of the invention to the disclosure, but various modifications may be resorted to, such as may lie within the spirit and scope of the appended claims.

What is claimed as new is:

1. A directional signal attachment for conventional spotlights including a universally movable lamp housing having a relatively large end and a relatively small end, a lens retaining rim at the large end of said housing and a cylindrical bracket projecting from the small end of the housing, said attachment comprising a substantially U-shaped wire rod clip disposed at one side of said housing parallel to the axis of the latter, a fastening element securing the bight portion of said clip to said lens retaining rim, a pair of laterally projecting resilient jaws provided at the free ends of said clip and having arcuate terminal portions constituting a pair of opposed concave seats, said clip extending longitudinally from said rim to beyond the small end of said housing and said seats of said jaws frictionally engaging said bracket, and a substantially heart-shaped signalling member formed from tubular material, said signalling member having a rounded end and a pointed end and being open at the center thereof, the bight end portion of said clip being embedded in the rounded end portion of said signalling member, said free ends of said clip being embedded in the pointed end portion of the signalling member whereby to secure the latter to said lamp housing, and the intermediate portions of the clip extending longitudinally between the large and small ends of the signalling member and being exposed in the open center of the latter.

2. The device as defined in claim 1 together with a strip-shaped pointer secured to said exposed intermediate portions of said clip and having its pointed end directed toward the pointed end portion of said signalling member.

References Cited in the file of this patent

UNITED STATES PATENTS

| | | |
|---|---|---|
| 1,406,290 | Schierding | Feb. 14, 1922 |
| 1,503,592 | Lewis | Aug. 5, 1924 |
| 2,149,125 | Shelly | Feb. 18, 1939 |